US009383863B2

(12) United States Patent
Mese et al.

(10) Patent No.: US 9,383,863 B2
(45) Date of Patent: Jul. 5, 2016

(54) MITIGATING INTENDED TOUCH SELECTION ERRORS

(71) Applicant: LENOVO (Singapore) PTE, LTD., New Tech Park (SG)

(72) Inventors: John Carl Mese, Cary, NC (US); Nathan J. Peterson, Durham, NC (US); Russell Speight VanBlon, Raleigh, NC (US); Rod D. Waltermann, Rougemont, NC (US); Arnold S. Weksler, Raleigh, NC (US)

(73) Assignee: Lenovo (Singapore) PTE LTD, New Tech Park (SG)

( * ) Notice: Subject to any disclaimer, the term of this patent is extended or adjusted under 35 U.S.C. 154(b) by 0 days.

(21) Appl. No.: 14/488,096

(22) Filed: Sep. 16, 2014

(65) Prior Publication Data

US 2016/0077666 A1    Mar. 17, 2016

(51) Int. Cl.
*G06F 3/041* (2006.01)

(52) U.S. Cl.
CPC .................................. *G06F 3/0418* (2013.01)

(58) Field of Classification Search
CPC . G06F 3/0488; G06F 3/04817; G06F 3/0482; G06F 3/0481; H04N 205/44565
See application file for complete search history.

(56) References Cited

U.S. PATENT DOCUMENTS

| 6,259,436 | B1 * | 7/2001 | Moon | G06F 3/0488 345/173 |
| 2009/0106694 | A1 * | 4/2009 | Kraft | G06F 3/0236 715/815 |
| 2014/0164973 | A1 * | 6/2014 | Greenzeiger | G06F 3/04886 715/773 |

* cited by examiner

*Primary Examiner* — Liliana Cerullo
(74) *Attorney, Agent, or Firm* — Kunzler Law Group

(57) ABSTRACT

For mitigating touch selection errors, code detects a touch selection error on a touch screen. In addition, the code mitigates the touch selection error based at least in part on a command history.

12 Claims, 9 Drawing Sheets

MITIGATING INTENDED TOUCH SELECTION ERRORS

BACKGROUND

1. Field

The subject matter disclosed herein relates to touch selections and more particularly relates to mitigating intended touch selection errors.

2. Description of the Related Art

Touch screens are often small relative to a user's finger. As a result, users occasionally make touch selection errors.

BRIEF SUMMARY

An apparatus for mitigating touch selection errors is disclosed. The apparatus includes a touch screen, a processor, and a memory that stores code executable by the processor. The code detects a touch selection error on the touch screen. In addition, the code mitigates the touch selection error based at least in part on a command history. A method and computer program product may also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
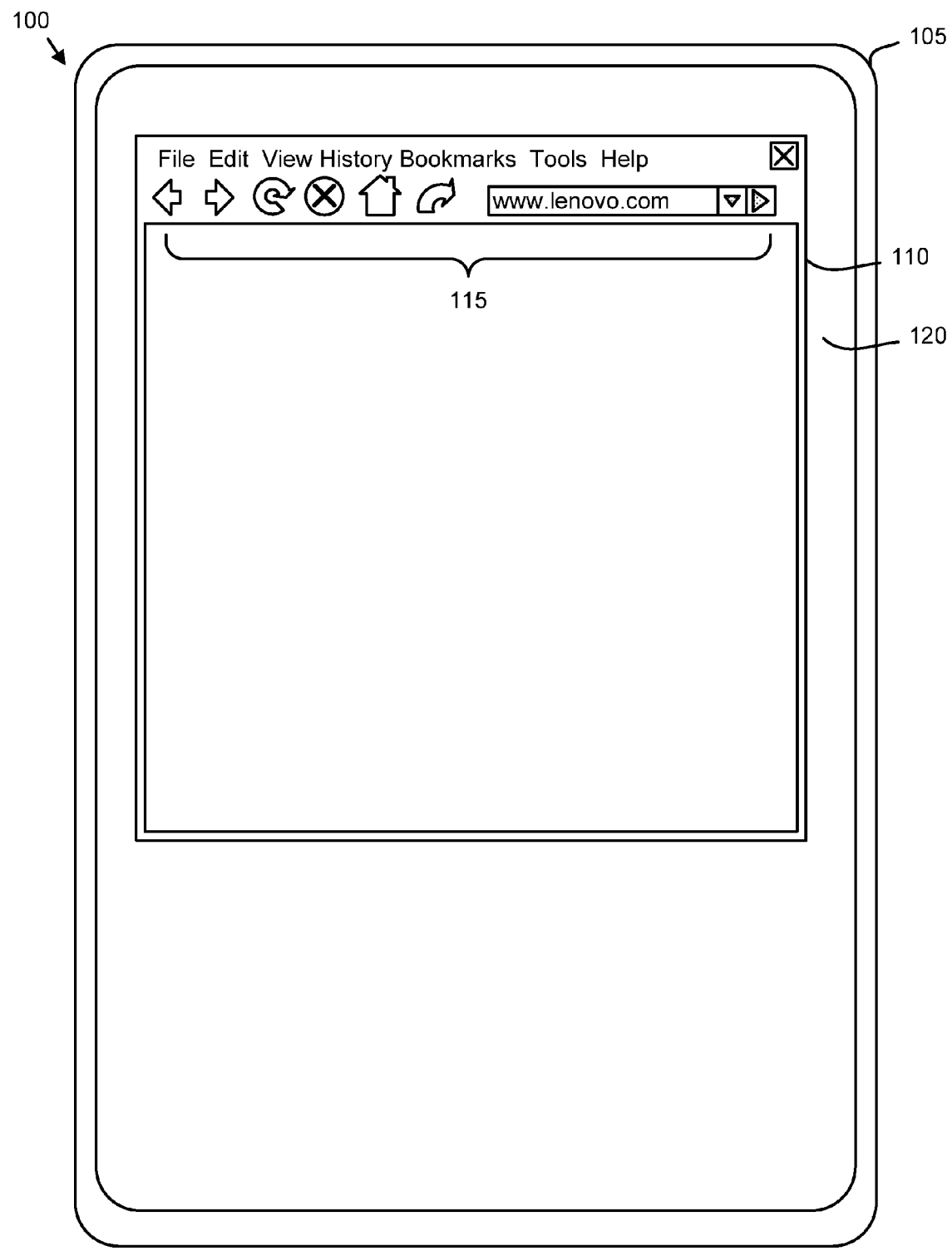
FIG. 1 is a drawing illustrating one embodiment of a touch selection system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a drawing illustrating one embodiment of a touch selection system 100. The system 100 includes an electronic device 105 with a touch screen 120. In the depicted embodiment, the touch screen 120 displays a browser 110. The browser 110 includes a plurality of command icons 115. In one embodiment, a command icon 115 is a displayed icon that if selected results in a response. The embodiments may be practiced with other types of applications and command icons 115.

A user may touch a command icon 115 on the touch screen 120. Unfortunately, touching an intended command icon 115 is not always easy. The command icons 115 may be small relative to the size of the user's finger or stylus. In addition, the electronic device 105 and/or the user may be in motion, further impeding a precise selection of a command icon 115.

In the past, upon making a touch selection error, a user would undo the touch selection error and then reattempt to touch the command icon 115 with greater care. Alternatively, the user may reattempt to touch the command icon 115 if the user narrowly missed the command icon 115. The embodiments described herein detect a touch selection error on the touch screen 120 and mitigate the touch selection error. In one embodiment, the touch selection error is mitigated by executing an intended touch selection. Alternatively, a plurality of intended touch selections may be displayed. The intended touch selections may be displayed as a list or as enlarged command icons 115 is will be described hereafter. As a result, the user may more easily execute or touch the desired command icon 115.

Figure 2A:
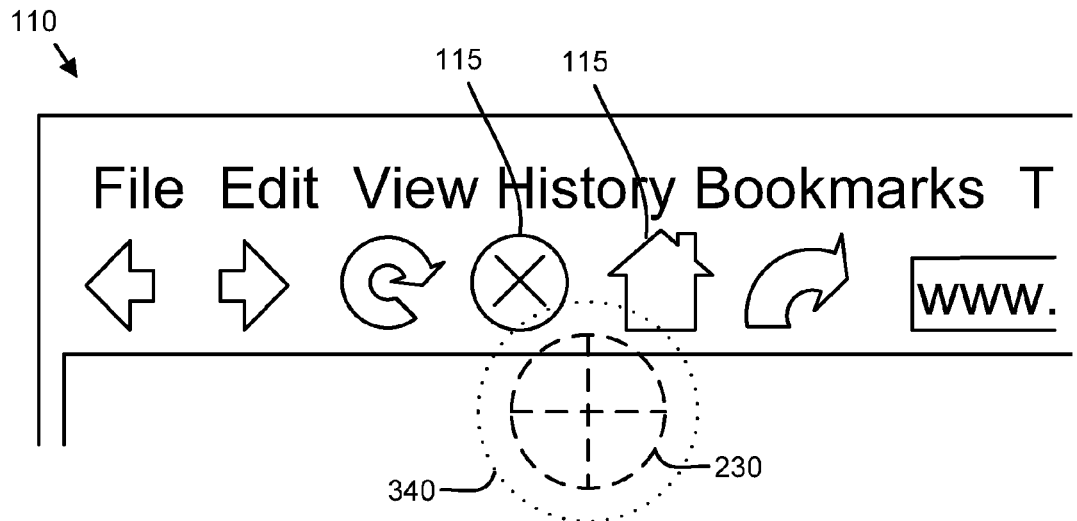
FIG. 2A is a drawing illustrating one embodiment of a touch selection error.

FIG. 2A is a drawing illustrating one embodiment of a touch selection error. The command icons 115 on the browser 110 of FIG. 1 are shown. A user may make a touch selection 230 on the touch screen 120. The touch selection 230 may be a near miss dead touch. In one embodiment, the touch selection 230 is a near miss dead touch if the touch selection 230 is within a dead touch distance 340 of the command icon 115.

Figure 2B:
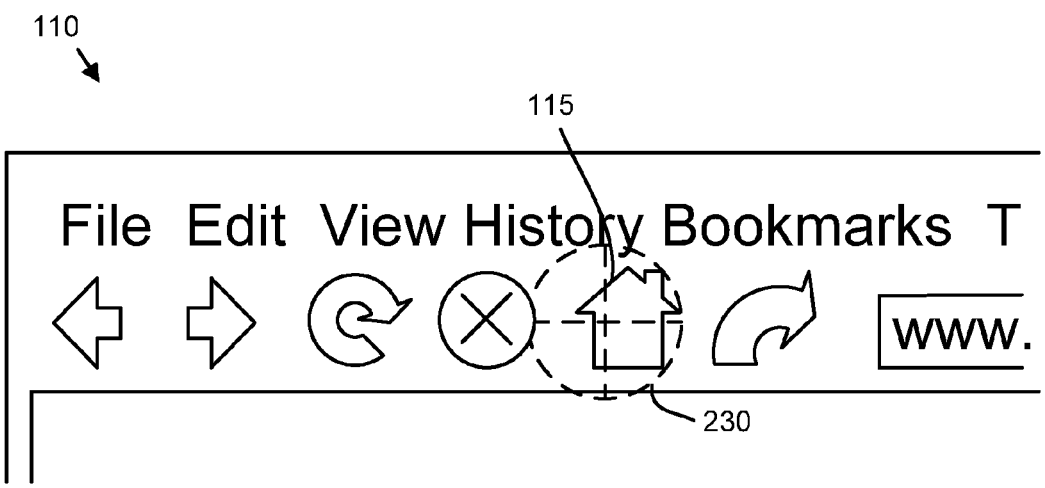
FIG. 2B is a drawing illustrating one alternate embodiment of a selection error.

FIG. 2B is a drawing illustrating one alternate embodiment of a touch selection error. The command icons 115 on the browser 110 of FIG. 1 are shown. A touch selection 230 is depicted made on a command icon 115. In one embodiment, the user did not intend to make the touch selection 230 on the command icon 115. The touch selection 230 may be a touch selection error if the touch selection 230 is followed by a command reversal of a valid command received within a valid command time interval.

In the depicted embodiment, the touch selection 230 on the command icon 115 is a valid command. If the user makes a command reversal of the valid command within the valid command time interval, the touch selection 230 is a touch selection error. The valid command time interval may be in the range of 0.5 to 3 seconds.

Figure 2C:
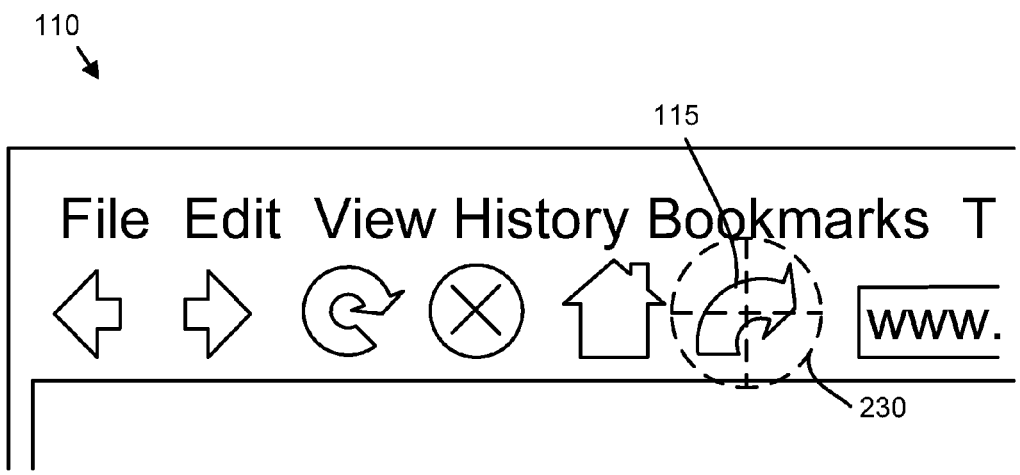
FIG. 2C is a drawing illustrating one embodiment of an undo command.

FIG. 2C is a drawing illustrating one embodiment of an undo command. The browser 110 of FIG. 1 is shown. The undo command may be a command reversal of a touch selection 230. In the depicted embodiment, the user makes a touch selection 230 on an undo command icon 115. The undo command may be a command reversal of a valid command.

Figure 2D:
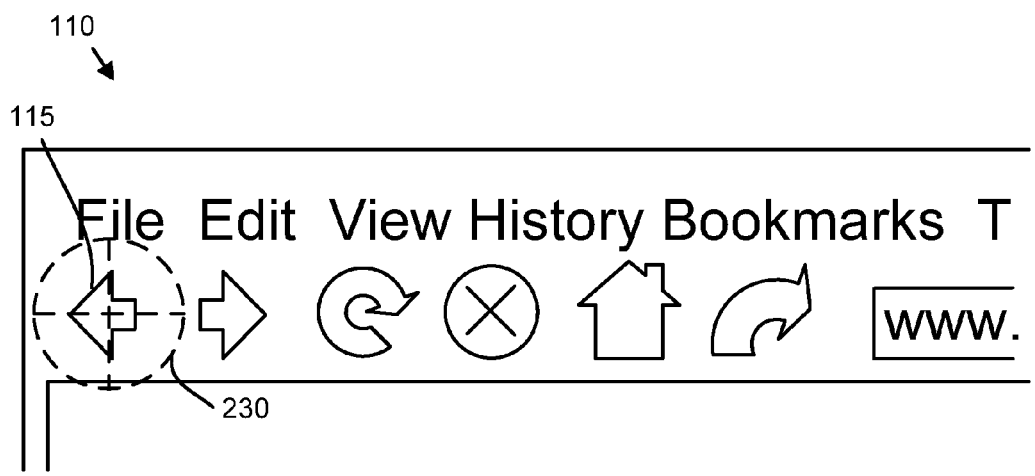
FIG. 2D is a drawing illustrating one embodiment of a back command.

FIG. 2D is a drawing illustrating one embodiment of a back command. The browser 110 of FIG. 1 is shown with a touch selection 230 made on a back command icon 115. The back command may be a command reversal of the valid command. If the command reversals of FIGS. 2C-D are made within the valid command time interval, the touch selections 230 may be touch selection errors.

Figure 2E:
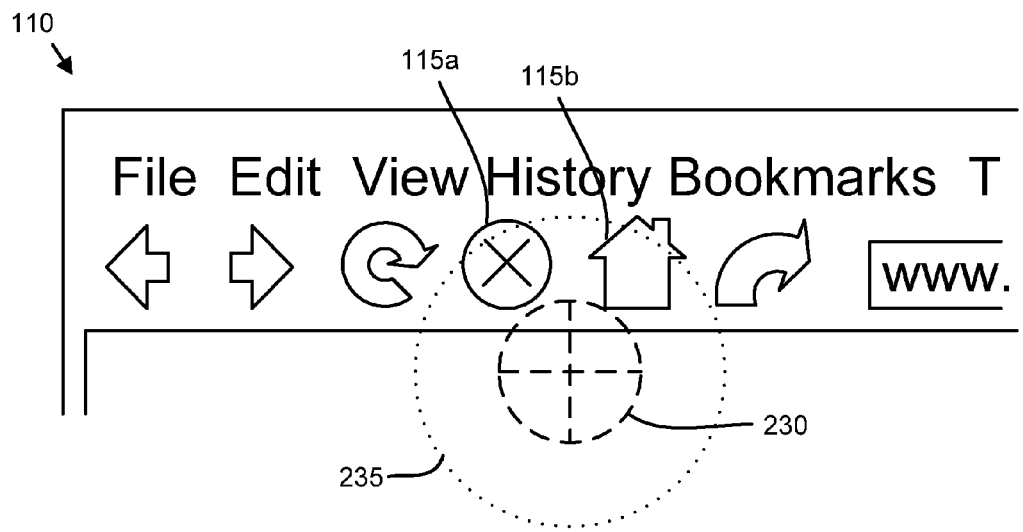
FIG. 2E is a drawing illustrating one embodiment of an error distance.

FIG. 2E is a drawing illustrating one embodiment of an error distance 235. The browser 110 of FIG. 1 is shown with the touch selection 230. The error distance 235 is a distance from the touch selection 230. In one embodiment, each command icon displayed within the error distance 235 of the location of the touch selection error may be an intended touch selection. In the depicted embodiment, a first and second command icon 115 are within the error distance 235 and may be intended touch selections.

Figure 2F:
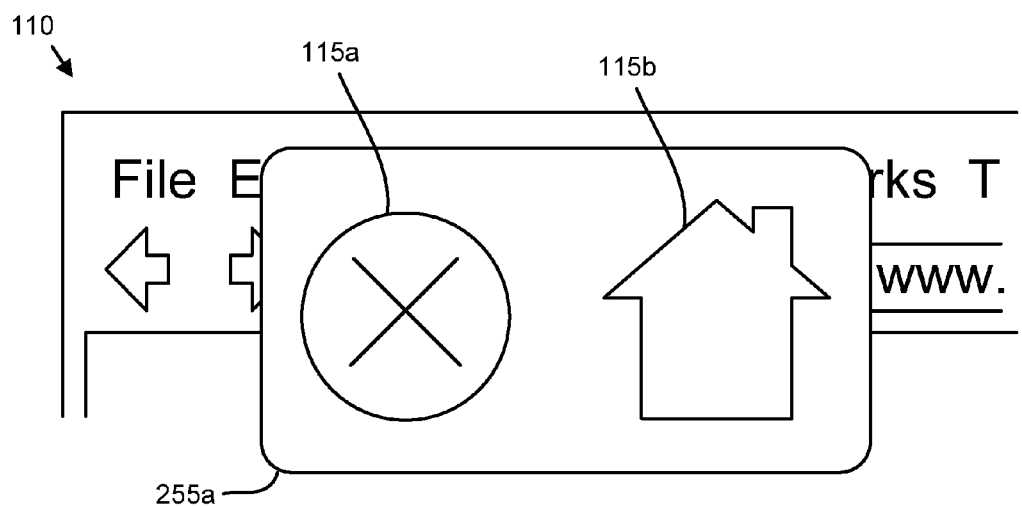
FIG. 2F is a drawing illustrating one embodiment of enlarged command icons.

FIG. 2F is a drawing illustrating one embodiment of enlarged command icons 115. The browser 110 of FIG. 1 is shown with intended touch selections 255a. The first and second command icons 115 of FIG. 2E are displayed as enlarged command icons 115. The first and second command icons 115 are displayed as enlarged command icons 115 in response to being identified as intended touch selections 255a. The user may easily select the enlarged command icons 115 of the intended touch selections 255a in order to cause the desired result.

Figure 2G:
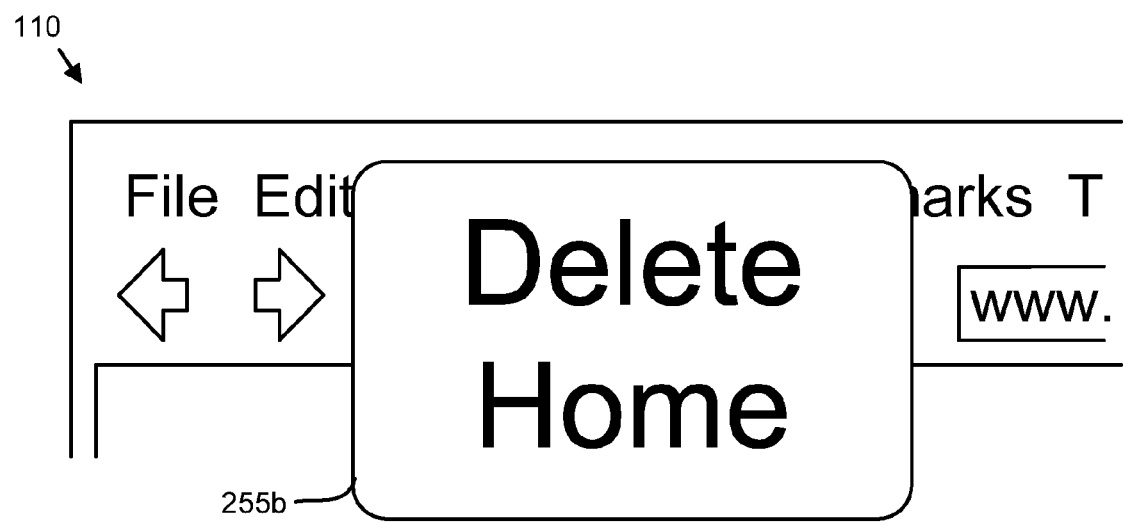
FIG. 2G is a drawing illustrating one embodiment of a list of intended touch selections.

FIG. 2G is a drawing illustrating one embodiment of a list of intended touch selections. The browser 110 of FIG. 1 is shown with an alternate embodiment of intended touch selections 255b. The intended touch selections 255b comprise a list with text equivalents of the intended touch selection command icons 115 of FIG. 2E. The user may easily select the text corresponding to a command icon 115 in order to execute a desired command.

Figure 3:
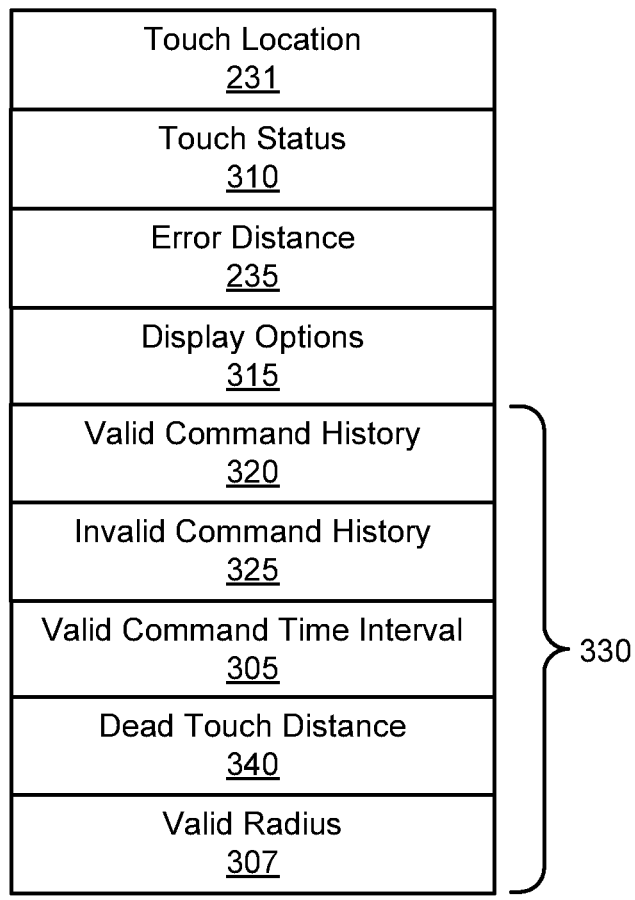
FIG. 3 is a schematic block diagram illustrating one embodiment of touch selection data.

FIG. 3 is a schematic block diagram illustrating one embodiment of touch selection data 300. The touch selection data 300 maybe organized as a data structure in a memory of a computer. In the depicted embodiment, the touch selection data 300 includes, a touch location 231, a touch status 310, the error distance 235, display options 315, and a command history 330 comprising the valid command time interval 305, a valid command history 320, an invalid command history 325, the dead touch distance 340, and a valid radius 307.

The touch location 231 may include the coordinates of the touch selection 230. The touch selection coordinates may be pixel coordinates, scalar distance coordinates, or the like. In addition, the touch's location 231 may include a description of the area of the touch selection 230. The error distance 235 may be a distance in pixels, a scalar distance, and the like.

The display options 315 may specify how the intended touch selections 255 are displayed. For example, the display options 315 may specify that the intended touch selections 255 are displayed as enlarged command icons 115. Alternatively, the display options 315 may specify that the intended touch selections 255 are displayed as a list. In addition, the display options 315 may specify that one intended touch selection 255 is executed. In one embodiment, the display options 315 may specify that the list is prioritized based on the valid command history 320, the invalid command history 325, or combinations thereof.

The valid command history 320 may record instances of touch selections 230 to command icons 115 without a subsequent command reversal within the valid command time interval 305. In addition, the valid command history 320 may calculate an average touch location 231 for each valid command. Table 1 illustrates one embodiment of a portion of the valid command history 320, recording a number of touch instances, the average touch location 231 for each valid command. The intended touch selections 255 may be the valid commands with an average touch location 231 within the valid radius 307 of the touch location 231.

TABLE 1

| Valid Command | Touch Instances | Average Touch Location 231 |
| --- | --- | --- |
| Refresh | 732 | 97.5, 46.8 |
| Delete | 116 | 137.2, 46.2 |
| Home | 415 | 175.9, 45.9 |

In one embodiment, the intended touch selections list 255b may be prioritized based on the valid command history 320. For example, the text equivalents of the command icons 115 in the intended touch selections list 255b may be ordered from the command icon 115 with the most recorded instances of touch selections 230 to the command icon 115 with the least recorded instances of touch selections 230.

The invalid command history 325 may record instances of touch selection errors. In one embodiment, the invalid command history 325 records an initial command icon 115 prior to the command reversal and is subsequently selected command icon 115 after the command reversal. Table 2 illustrates one embodiment of a portion of the invalid command history 325. Instances of a plurality of subsequent command icons 115 are recorded for each initial command icon 115.

TABLE 2

| Initial Command | Subsequent Command Icon 115 | | |
|---|---|---|---|
| Icon 115 | Refresh | Delete | Home |
| Refresh | 1 | 5 | 1 |
| Delete | 2 | 1 | 0 |
| Home | 2 | 4 | 1 |

The invalid command history 325 may be used to prioritize the intended touch selections list 255b. For a given initial command icon 115 that is a touch selection error, the intended touch selections 255b may be listed in order from most recorded instances of subsequent command icon selections to least recorded instances of subsequent command icon selections. For example, if the "Delete" command is the initial command icon 115 of the touch selection error, and the "Refresh" and "Home" commands are included in the list of intended touch selections 255b, the "Refresh" command may be prioritized first and the "Home" command may be prioritized second.

The valid command time interval 305 may specify a time interval. If the command reversal of a valid command is received within the valid command time interval 305, a touch selection 230 may be a touch selection error.

Figure 4:
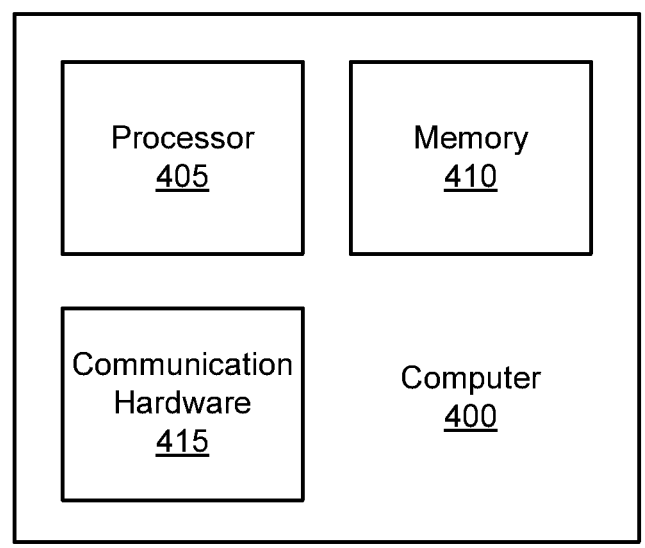
FIG. 4 is a schematic block diagram illustrating one embodiment of a computer.

FIG. 4 is a schematic block diagram illustrating one embodiment of a computer 400. The computer 400 may be embodied in the electronic device 105. Alternatively, the computer 400 may be in communication with the electronic device 105. In the depicted embodiment, the computer 400 includes a processor 405, a memory 410, and communication hardware 415. The memory 410 may be a computer readable storage medium. The memory 410 may include a semiconductor storage device, a hard disk drive, an optical storage device, a micromechanical storage device, or combinations thereof. The memory 410 may store code. The processor 405 may execute the code. The communication hardware 415 may communicate with other devices.

Figure 5:
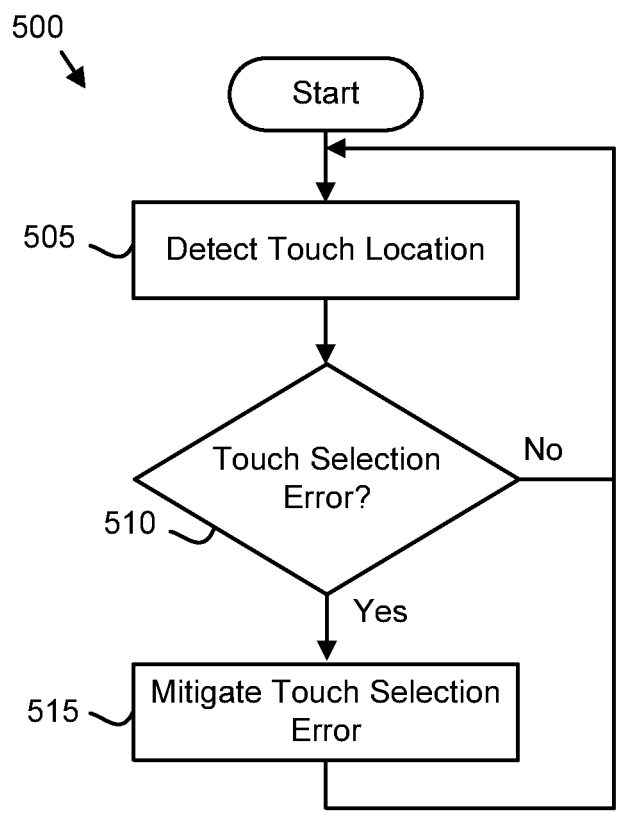
FIG. 5 is a schematic flow chart diagram illustrating one embodiment of a touch error mitigation method.

FIG. 5 is a schematic flow chart diagram illustrating one embodiment of a touch error mitigation method 500. The method 500 may detect and mitigate a touch selection error. The method 500 may be performed by a processor 405. Alternatively, the method 500 may be performed by a computer readable storage medium storing code that is executed by the processor 405.

The method 500 starts, and in one embodiment, the code detects 505 a touch location 231 on the touch screen 120. The touch location 231 may be detected 505 with capacitive sensor. Alternatively, the touch location 231 may be detected 505 with an optical sensor.

In one embodiment, the code detects 510 a touch selection error on the touch screen 120 from the touch location 231. The touch selection error may be a near miss dead touch as illustrated in FIG. 2A. The near miss dead touch may not generate a valid command. For example, if the touch location 231 does not include a command icon 115, the touch's location 231 may be a near miss dead touch. The touch selection 230 may be a near miss dead touch if the touch selection 230 is within the dead touch distance 340 of the command icon 115.

Alternatively, the touch selection error may be a command reversal of a valid command as illustrated in FIGS. 2B-D. In one embodiment, if the command reversal of the valid command is received within the valid command time interval 305, a touch selection error is detected 510. For example, the touch location 231 may be on a command icon 115. If the command reversal is received within a valid command time interval 305, a touch selection error is detected 510.

If the touch selection is not detected 510, the code continues to detect 505 touch locations 231 and the method 500 ends. If the touch selection is detected 510, the code may mitigate 515 the touch selection error. In one embodiment, the code mitigates 515 the touch selection error based at least in part on the command history 330. The mitigation 515 the touch selection error is described in more detail for FIG. 6.

Figure 6:
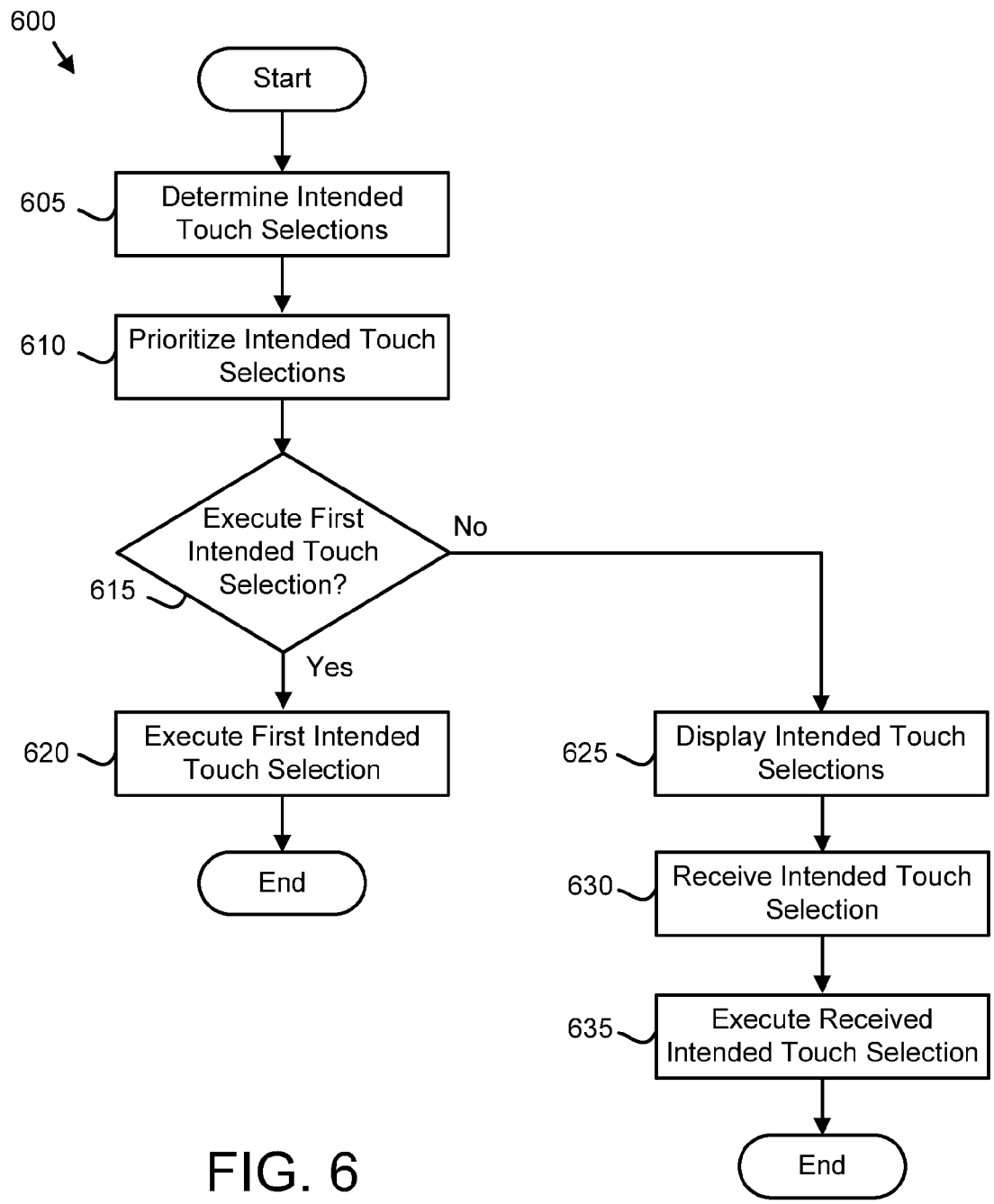
FIG. 6 is a schematic flow chart diagram illustrating one embodiment of a touch selection error mitigation method.

FIG. 6 is a schematic flow chart diagram illustrating one embodiment of a touch selection error mitigation method 600. The method 600 may mitigate a touch selection error in response to detecting a touch selection error as described for FIG. 5. The method 600 may be performed by a processor 405. Alternatively, the method 600 may be performed by a computer readable storage medium storing code that is executed by the processor 405.

The method 600 starts, and in one embodiment, the code determines 605 the intended touch selections 255. In one embodiment, the code consults the valid command history 320 to determine 605 the intended touch selections 255. The intended touch selections 255 may be the valid commands with an average touch location 231 within the valid radius 307 of the touch location 231. Alternatively, the intended touch selections 255 may be a specified intended selection number of command icons 115 nearest to the touch location 231. The specified intended selection number may be in the range of 2 to 4. For example, if the intended selection number is three, the intended touch selections 255 may be the three valid commands with average touch locations 231 closest to the touch location 231.

In addition, the code may determine 605 the intended touch selections 255 based on the invalid command history 325. The invalid command history 325 may be consulted in response to a command reversal. In one embodiment, the code uses the initial command icon 115 of the command reversal as an index to select the intended selection number of subsequent command icons 115 corresponding to the initial command icon 115 from the invalid command history 325.

In one embodiment, the intended touch selections 255 include each command icon 115 displayed within the error distance 235 of a touch location 231 of the touch selection error. In addition, the intended touch selections 255 may exclude a command icon 115 of a valid command. For example, if the valid command is reversed as part of a command reversal, the valid command may be excluded from the intended touch selections 255.

The code may further prioritize 610 the intended touch selections 255. The intended touch selections 255 may be prioritized 610 based on the command history 330. In one embodiment, intended touch selections 255 are prioritized based on a distance of the average touch location 231 of a valid command in the valid command history 320 to the touch location 231. In a certain embodiment, the intended touch selections 255 are prioritized based on the touch instances of the valid command history 320. Valid commands with more touch instances may be prioritized ahead of valid commands with fewer touch instances.

In an alternative embodiment, the intended touch selections 255 are prioritized 610 based on a number of instances of each subsequent command icon 115 in response to an initial command icon 115. For example, using table 2, if the initial command icon 115 as the "Delete" command icon 115, the intended touch selections 255 may be prioritized as "Refresh," "Delete," and "Home."

The code may further determine 615 whether to execute a first intended touch selection. The first intended touch selection may be a highest priority intended touch selection 255. The code may execute the first intended touch selection if there is only one intended touch selection 255. Alternatively, the code may determine 615 to execute the first intended touch selection in response to a display option 315 specified by a user.

If the code determine 615 to execute the first intended touch selection, the code executes 620 the first intended touch selection and the method 600 ends. If the code determines 615 not to execute the first intended touch selection, the code may display 625 the intended touch selections 255. The intended touch selections 255 may be displayed as enlarged command icons 115 as shown in FIG. 2F. Alternatively, the intended touch selections 255 may be displayed as a list as shown in FIG. 2G. The intended touch selections list 255b may be prioritized based on the command history 330.

The code may further receive 630 a selected intended touch selection in response to a user touching an enlarged command icon 115 or touching a selection on the intended touch selections list 255b. The code may execute 635 the selected intended touch selection and the method 600 ends. For example, the code may perform a function associated with the command icon 115 of the selected intended touch selection to execute the selected intended touch selection.

By detecting and mitigating touch selection errors on a touch screen 120, the embodiments make it easier for a user to accurately select a command icon 115 after touch selection error. The command icon 115 may be accurately selected even if the command icon 115 is small relative to the size of the user's finger or stylus. As a result, user interactions 120 are greatly facilitated.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a touch screen;
   a processor;
   a memory that stores code executable by the processor to:
   record a valid command history that comprises instances of touch selections to command icons without a subsequent command reversal within a valid command time interval:
   detect a touch selection error on the touch screen, wherein the touch selection error comprises a touch selection followed by a command reversal of a valid command within the valid command time interval;
   determine a plurality of intended touch selection based on the valid command history, wherein the plurality of intended touch selections comprise each command icon in the valid command history that is displayed within an error distance of a touch location of the touch selection error;
   display a list of the plurality of intended touch selections;
   receive a selection of one intended touch selection from the plurality of displayed intended touch selections; and
   execute the one intended touch selection.

2. The apparatus of claim 1, wherein the touch selection error further comprises a near miss dead touch that does not generate a valid command.

3. The apparatus of claim 1, wherein the plurality of intended touch selections exclude a command icon of a valid command.

4. The apparatus of claim 1, wherein the list of the plurality of intended touch selections is prioritized based on the command history.

5. The apparatus of claim 1, wherein the list of the plurality of intended touch selections is displayed as enlarged command icons.

6. A method comprising:
   recording a valid command history that comprises instances of touch selections to command icons without a subsequent command reversal within a valid command time interval;
   detecting, by use of a processor, a touch selection error on a touch screen, wherein the touch selection error comprises a touch selection followed by a command reversal of a valid command within the valid command time interval;
   determining a plurality of intended touch selections based on the valid command history, wherein the plurality of intended touch selections comprises each command icon in the valid command history that is displayed within an error distance of a touch location of the touch selection error;
   displaying a list of the plurality of intended touch selections;
   receiving a selection of one intended touch selection from the plurality of displayed intended touch selections; and
   executing the one intended touch selection.

7. The method of claim 6, wherein the touch selection error further comprises a near miss dead touch that does not generate a valid command.

8. The method of claim 7, wherein the plurality of intended touch selections exclude a command icon of a valid command.

9. The method of claim 7, wherein the list of the plurality of intended touch selections is prioritized based on the command history.

10. The method of claim 7, wherein the list of the plurality of intended touch selections is displayed as enlarged command icons.

11. A program product comprising a non-transitory computer readable storage medium that stores code executable by a processor, the executable code comprising code to perform:
   recording a valid command history that comprises instances of touch selections to command icons without a subsequent command reversal within a valid command time interval;
   detecting a touch selection error on a touch screen, wherein the touch selection error comprises a touch selection followed by a command reversal of a valid command within the valid command time interval;
   determining a plurality of intended touch selections based on the valid command history, wherein the plurality of intended touch selections comprise each command icon in the valid command history that is displayed within an error distance of a touch location of the touch selection error;
   displaying a list of the plurality of intended selections;
   receiving a selection of one intended touch selection from the plurality of displaying intended touch selections; and
   executing the one intended touch selection.

12. The program product of claim 11, wherein the touch selection error further comprises a near miss dead touch that does not generate a valid command.

* * * * *